Patented June 17, 1941

2,246,311

UNITED STATES PATENT OFFICE 2,246,311

WAX MODIFYING AGENT

Eugene Lieber, Linden, and Martin M. Sadlon, Roselle Park, N. J., assignors to Standard Oil Development Company, a corporation of Delaware No Drawing. Application June 22, 1937, Serial No. 149,678

7 Claims. (Cl. 260—666)

The present invention relates to improved wax modifying agents and more specifically to improved agents useful as pour depressants in waxy lubricating oils and as assistants in the dewaxing of mineral oils and as blending agents.

The invention will be fully understood from the following description. Wax modifying agents have been previously prepared according to the disclosures in U. S. 1,815,022 by condensation of suitable paraffinic substances having long chains such as chlorinated paraffin wax on substances containing cyclic nuclei, such as naphthalene, by means of the Friedel Craft type catalysts. Various paraffinic substances have been suggested such as alcohols, olefines, acid chloride and the like, and a number of different cyclic compounds have been proposed such as cyclic hydrocarbons, particularly aromatics, phenols, amines, and highly condensed aromatics such as crackene, picene and the like.

It has been found that excellent modifying agents can now be prepared by the condensation of suitable paraffinic substances on polymerized unsaturated cyclic compounds and that such materials are often more potent than are obtained from ordinary unpolymerized cyclic materials. It will be understood that in this connection the term "polymerized" is here used in the strict sense in which the polymer has the same ultimate analysis as the unpolymerized material but differs in molecular weight. The term is used in direct contrast to "condensed" under which term are included higher molecular weight products made by the union of two or more molecules through the elimination of some element or group of elements such as hydrogen, water or the like, with the result that the condensation product has an ultimate analysis differing from that of the original material which underwent the condensation. The distinction between the two processes of polymerization and condensation has been long recognized in chemical literature, different agents affecting different types of reaction and different products being necessarily produced; see Ellis' "Chemistry of Synthetic Resins," vol. 1, page 42.

In making the improved wax modifying agents any suitable paraffinic substance may be used in which there is a hydrocarbon chain of at least 10 or 12 carbon atoms. The preferable substance is paraffin wax which has been chlorinated to the extent of about 10 to 15% or more. Olefins of the same type may be used, particularly those produced from the chlorinated wax by dechlorination, and acid chlorides containing at least 10 carbon atoms in a chain. The corresponding alcohols, ethers, ketones and the like may also be used.

As the cyclic substance, polymerized partially hydrogenated aromatic materials are preferably employed, such as the polymers of dihydrodiphenyl, $C_6H_7.C_6H_5$, or of dihydronaphthalene, $C_{10}H_{10}$, or more generally any of the polymerized derivatives of such materials. Similar materials may be made from the hydro-derivatives of diphenyl or dinaphthyl or phenyl-naphthyl compounds, e. g. dihydro-phenyl-naphthyl, etc. Similarly, polymerization products may be made from cyclo hexene or its alkylated derivatives, or from the incompletely hydrogenated naphthalenes such as di and tetra hydro naphthalenes. The hydrocarbon materials are preferred because the resulting products are free from any foreign element that might be considered an impurity in a mineral lubricating oil. It is also possible to use co-polymers.

Preparation of the polymerized partially hydrogenated aromatic is no part of the present invention and methods for producing such compounds are well known. The most usual method consists in treating the material to be polymerized with a metal of the alkali group such as sodium or potassium or with an alloy of such metal. The conditions of treatment are well known in the art as, for example, the alkali treated products may be subjected to an atmosphere of hydrogen at low temperature.

The reaction giving rise to the wax modifier is conducted at a temperature in the approximate range from about room temperature to about 200 or 250° F. depending on the particular reagents, catalysts and amount thereof; the optimum temperature may vary considerably within this range. For 100 parts of the paraffinic material it is usual to employ between 10 and 20 parts of the polymerized cyclic compound with ½ to 5 or more parts of anhydrous aluminum chloride or other equivalent halide catalyst such as zinc chloride, iron chloride, boron fluoride, and the like. The time of reaction may vary considerably with other conditions, but it is ordinarily from one-half to six hours or more and the reaction may be conducted either in the presence or absence of solvent media. The most useful solvents are saturated hydrocarbons, carbon disulfide, poly chlor aliphatics, particularly the saturated compounds having two to three carbon atoms, and di or polychlor aromatics.

The modifiers are preferably separated from the reaction mixture by hydrolyzing the catalyst with aqueous of alcoholic soda, then settling and withdrawing the sludge. The solvent and unreacted materials are distilled off with fire and steam or under vacuum so as to avoid thermal decomposition of the residue. This material is a very viscous substance having powerful pour inhibiting properties. This is especially the case in heavier oils and where the material is used in very small quantities. When added in such quantities it does not appreciably change the viscosity or viscosity index of the oil to which it is added but if added in larger amounts, say 2 to 5% or more, it effects a considerable increase in viscosity as well as viscosity index and it may be used for this purpose in non-waxy as well as waxy oils.

The following examples are given to illustrate the method of making the modifier and to illustrate its properties:

*Example I*

13.5 parts by weight of polymerized dihydronaphthalene ($C_{40}H_{40}$) are suspended in 25 parts of substantially saturated kerosene and 1.4 parts of anhydrous aluminum chloride is added. The temperature is raised to 125° F. and 100 parts of chlorinated paraffin wax (11% Cl) are added slowly over a period of 30 minutes. The reaction mixture is continually agitated for one hour, measured from the time of the first addition of the chlorwax, and the temperature is maintained as 125° F. throughout.

At the end of the hour aqueous soda was added and the catalyst hydrolyzed. The sludge was settled and drawn off and the unreacted wax and solvent were distilled off leaving 39% bottoms having a high viscosity.

The residue, which is the wax modifying agent, was then added to two different lubricating oils. Both of these oils had normal pour points of 30° F., the second being more viscous and ordinarily less responsive to the action of pour inhibitors. The amounts added and the pour reduction obtained on the two oils are given in the following table:

| Percent modifier | Oil No. 1 | Oil No. 2 |
|---|---|---|
|  | °F. | °F. |
| 0 | 30 | 30 |
| .15 | −5 | −10 |
| .075 | 0 | −5 |
| .0375 | +10 | +15 |

*Example II*

When 5% of the modifying agent prepared under Example I is added to a waxy oil, the following changes were found in its properties:

| Sample | Vis. @ 100° | Vis. @ 210° | V. I. | Pour point |
|---|---|---|---|---|
|  |  |  |  | Degrees |
| Oil (no modifier) | 149 | 42.9 | 100 | 30 |
| Oil plus 5% modifier | 216 | 49.4 | 120 | −35 |

Viscosities are in Saybolt seconds.

*Example III*

The modifier prepared in Example I is added in two different proportions to substantially wax free oils. The changes in viscosity and viscosity index and pour point are given in the following table:

| Sample | Vis. @ 100° | Vis. @ 210° | V. I. | Pour point |
|---|---|---|---|---|
|  |  |  |  | °F. |
| Oil (no modifier) | 209 | 44.0 | 36 | −25 |
| Oil plus 2.5% modifier | 262 | 47.3 | 57 | −35 |
| Oil plus 5.0% modifier | 322 | 51.2 | 75 | −35 |

The material produced herein is also useful as a compounding agent for heavy lubricants such as gear oils or in greases containing alkali, alkaline earth, or heavy metal soaps, and has the property of increasing their adherent properties.

The present invention is not to be limited to any theory of the manufacture of an inhibitor, nor its action, nor to any specific paraffinic material, nor to any specific polymerized cyclic compound, but only to the following claims in which it is desired to claim all novelty inherent in the invention as broadly as the prior art permits.

We claim:

1. A composition comprising a condensation product of a paraffinic substance having a hydrocarbon chain of at least ten carbon atoms and a polymer of a partially hydrogenated naphthalene.

2. A composition comprising a condensation product of chlorinated paraffin wax with from 10 to 20% of its weight of polymerized dihydro naphthalene, the reaction being effected by the presence of a catalyst of the aluminum chloride type.

3. A composition comprising a condensation product of a paraffinic substance having a hydrocarbon chain of at least ten carbon atoms with a polymerized compound of the group consisting of polymerized partially hydrogenated aromatic hydrocarbons, polymerized alkyl homologs thereof, and co-polymers of such materials, all of said hydrocarbons containing unsaturation only in the nucleus.

4. A composition comprising a condensation product of a paraffinic substance having a hydrocarbon chain of at least ten carbon atoms and polymerized dihydronaphthalene.

5. A composition comprising a condensation product of chlorinated paraffin wax and polymerized dihydronaphthalene.

6. The process which comprises condensing an aliphatic substance having a hydrocarbon chain of at least 10 carbon atoms with a polymerized compound of the group consisting of polymerized partially hydrogenated aromatic hydrocarbons, polymerized alkyl homologues thereof, and co-polymers of such material, all of said hydrocarbons containing unsaturation only in the nucleus, in the presence of a Friedel-Craft catalyst, and distilling the condensation products to obtain a high molecular weight distillation residue soluble in mineral oils and useful as an addition agent for mineral lubricating oils.

7. The process of preparing products useful as addition agents in mineral lubricating oils, which comprises condensing about 100 parts by weight of chlorinated paraffin wax with about 10 to 20 parts by weight of polymerized dihydronaphthalene, in the presence of aluminum chloride at a temperature between about room temperature and 250° F., hydrolyzing the catalyst, settling and withdrawing the sludge and distilling the condensation products with fire and steam or under vacuum to obtain as distillation residue a high molecular weight condensation product soluble in mineral oils and having the properties of thickening, increasing the viscosity index of, and reducing the pour point of mineral lubricating oils when added thereto in small amounts.

EUGENE LIEBER.
MARTIN M. SADLON.